(12) United States Patent
Mister

(10) Patent No.: US 7,328,457 B1
(45) Date of Patent: Feb. 5, 2008

(54) METHOD AND APPARATUS FOR PREVENTING INTERCEPTION OF INPUT DATA TO A SOFTWARE APPLICATION

(75) Inventor: Serge Jean Maurice Mister, Ottawa (CA)

(73) Assignee: Entrust Limited, Ottawa, Ontario (CA)

( * ) Notice: Subject to any disclaimer, the term of this patent is extended or adjusted under 35 U.S.C. 154(b) by 0 days.

(21) Appl. No.: 09/343,958

(22) Filed: Jun. 30, 1999

(51) Int. Cl.
*G06F 7/04* (2006.01)

(52) U.S. Cl. .................................................. 726/30

(58) Field of Classification Search ................ 719/194; 713/194, 193; 726/26, 27, 30
See application file for complete search history.

(56) References Cited

U.S. PATENT DOCUMENTS

| | | | | |
|---|---|---|---|---|
| 3,878,332 | A * | 4/1975 | Morgan et al. | 380/28 |
| 4,744,077 | A * | 5/1988 | Fadem et al. | 370/230 |
| 4,805,222 | A * | 2/1989 | Young et al. | 382/115 |
| 5,870,474 | A * | 2/1999 | Wasilewski et al. | 380/211 |
| 6,056,193 | A * | 5/2000 | McAuliffe et al. | 235/380 |
| 6,166,729 | A * | 12/2000 | Acosta et al. | 715/719 |
| 6,476,854 | B1 * | 11/2002 | Emerson et al. | 348/143 |
| 6,522,769 | B1 * | 2/2003 | Rhoads et al. | 382/100 |
| 6,587,949 | B1 * | 7/2003 | Steinberg | 713/193 |

OTHER PUBLICATIONS

Oommen, B. John, and van Oorschot, P.C., "Randomized Encryption With Insertions and Deletions Based On Probability Distributions," Jun. 16, 1994.
Rivest, Ronald L.; Chaffing and Winnowing: Confidentiality Without Encryption; Apr. 24, 1998; pp. 1-8; MIT Lab for Computer Science; from www.theory.lcs.mit.edu.
Ellis, JH; The Story of Non-Secret Encryption; Dec. 16, 2006; from www.web.archive.org; pp. 1-6.

* cited by examiner

*Primary Examiner*—Kambiz Zand
*Assistant Examiner*—Aubrey H Wyszynski
(74) *Attorney, Agent, or Firm*—Vedder, Price, Kaufman & Kammholz, P.C.

(57) ABSTRACT

A method and apparatus facilitates the prevention of interception of incoming data, such as keystroke data in the form of a message to an application, by inserting application generated random insertion data into a message stream. The random insertion data is related to actual data that is being generated for a software application so that it is difficult for an attacker to distinguish between actual message data and inserted message data. The system and method then reads incoming data typically in the form of messages, and filters out the messages that it determines were knowingly inserted. The remaining received messages are determined to be actual data from the data source, such as a keyboard, voice input or other suitable data source. In one embodiment, the system effectively hides actual input data such as actual keystrokes in a stream of randomly generated fake keystrokes.

34 Claims, 5 Drawing Sheets

MSG FILTER FLOW

METHOD AND APPARATUS FOR PREVENTING INTERCEPTION OF INPUT DATA TO A SOFTWARE APPLICATION

FIELD OF THE INVENTION

The invention relates generally to methods and devices that prevent interception of input data to software applications and more particularly to devices and methods that prevent interception of incoming data such as keyboard input data, voice data or other suitable input data to a software application to avoid detection of keyboard input or other inputs into a software application.

BACKGROUND OF THE INVENTION

Many security software packages require that a password be typed by a user to authenticate the user. Once this password is entered, a software application such as a cryptographic application may perform strong cryptographic operations on behalf of the user with no further authentication. Thus, the password is one of the main secrets protecting a user's security.

The design of some operating systems, such as windows-based operating systems and UNIX-type operating systems, for example, allow software applications to intercept keyboard events such as keyboard messages destined for use by a program, before they are delivered to the program or other software application. This facility allows a rogue application to record, for example, a password entered by a user as it is typed into the security application. It would be desirable to prevent such an attack. In addition, further data being input into an application may take many other forms, such as voice input or other input. In addition, applications other than security applications also require input data for operation and as such it would be desirable to limit or substantially prevent interception of incoming data to such applications.

Some operating systems provide a type of operating system based prevention technique that prevents, for example, keyboard data interceptions by allowing specified programs to run on the operating system through a "secure desktop". Such operating systems allow a user, for example, to open a secure desktop and designate which applications can be run in the secure desktop. Such systems typically provide access controls which limit the programs that can run on the secure desktop. A problem with such systems is that the secure desktop will still allow keyboard interception programs to run if they are embedded in an application that has been designated to be accessible in the secure desktop. Hence, if a keyboard "sniffing" program is embedded in an application, the secure desktop may still allow the launch of the keyboard sniffing program when the software application is launched.

Other operating systems may include a software keyboard locking interface that allows a user to indicate that the operating system should grant exclusive access to the keyboard for a particular software application. However, such operating systems can be quite costly and there are many applications that may not be compatible with such operating systems. These applications would benefit from the prevention of interception of incoming data.

Consequently, there exists a need for a method and device for facilitating prevention of interception of incoming data for a software application that may be application based or non-operating system based to allow such a method or device to be used independently from a particular type of operating system or operating system based interception prevention program.

BRIEF DESCRIPTION OF THE DRAWINGS

The below disclosure will be more readily understood in view of the following drawings, wherein.

DETAILED DESCRIPTION OF A PREFERRED EMBODIMENT OF THE INVENTION

Briefly, a method and apparatus facilitates the prevention of interception of incoming data, such as keystroke data in the form of a message to an application, by inserting application generated random insertion data into a message stream. The random insertion data is related to actual data that is being provided for the software application so that it is difficult for an attacker to distinguish between actual message data and inserted message data. The system and method then reads incoming data typically in the form of messages, and filters out the messages that it determines were knowingly inserted. The remaining received messages are determined to be actual data from the data source, such as a keyboard, voice input or other suitable data source. In one embodiment, the system effectively hides actual input data such as actual keystrokes in a stream of randomly generated fake keystrokes. Potential attacking software cannot distinguish between inserted or randomly generated fake keystrokes and the actual keyboard messages to separate the actual input from inserted input.

Figure 1:
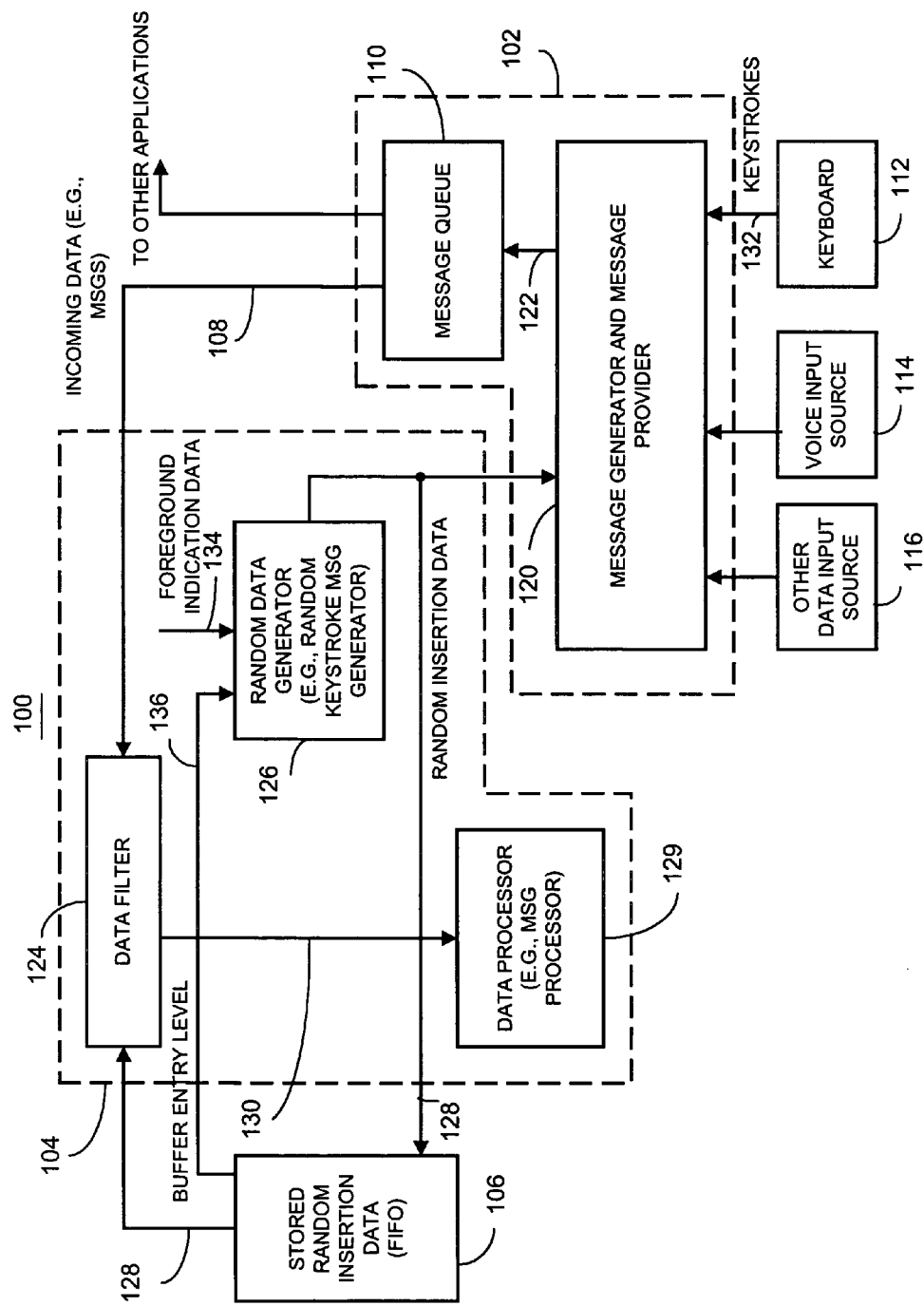
FIG. 1 is a block diagram illustrating one example of an apparatus for facilitating prevention of interception of incoming data to a software application in accordance with one embodiment of the invention.

FIG. 1 illustrates one example of an apparatus 100 for facilitating prevention of interception of incoming data to a software application. The apparatus 100 includes a programmed data processing device, such as an IBM compatible personal computer or any other suitable processing device that utilizes or runs software applications. Software applications may be any executable instruction based program or non-executable based software that utilizes some type of input data and uses the input data to provide a function. In this particular example, the apparatus 100 may be part of a computer, telecommunication device, or other device, that has an operating system 102 and a software application 104 as well as memory 106 that may be accessible, for example, by the operating system and/or the application. If desired, multiple applications may also be running on the apparatus 100. The software application 104 in this example receives incoming data 108 in the form of messages from a message queue 110 that is filled by the operating system 102. A keyboard 112, voice input system 114 or other input source 116 provides actual data for use by the software application 104. For purposes of illustration, the example of the input device used hereafter will be that of the keyboard 112. Accordingly, actual data may include keyboard strokes that are entered, for example, by users entering a password for the software application in the event the software application is a security software application, for example. However, the input data may be any suitable data. The actual data in the form of keystroke data from the keystroke source 112 is input to a message generator and message provider 120. A message generator and message provider 120, as known in the art, may be an operating system controlled message generation system that provides message data 122 to the message queue 110 for one or more software applications. It will be recognized that the message generator and message provider 120 may be provided by some other source other than an operating system. The message generator and message provider 120 receives the generated random insertion data 128 as well as the actual data 132 from keyboard 112 or other suitable data input source and queues the random insertion data 128 with the actual data 132 in the order in which it is received, for the queue 110, for output as the incoming data 108.

The apparatus 100 also includes an incoming message filter 124, a random data generator 126, and a message processor 129. These may be implemented in the form of software, hardware or a suitable combination thereof. The application 104 may be written to include the filter 124, the random data generator 126 and the message processor 129, if desired. The random data generator 126 generates random insertion data 128 such as random keystroke message data that is provided to the message generator and message provider 120. The random insertion data 128 is mixed with the incoming data. For example, the random insertion data 128 is stored in the message queue 110 continuously with actual message data directly generated through the keyboard 112. As such, the message queue 110 will provide incoming data 108 that includes both random inserted message data 128 and actual message data from the actual keyboard strokes to the application 104.

In this embodiment, the random data generator 126 provides, under control of the software application that is to receive the incoming data, the random insertion data 128 for insertion as part of the incoming data 108. However, it will be recognized that the generator may be under control of any suitable source. The insertion data may be generated or obtained from a random table or any other suitable source. The application 104 also stores a copy of the generated random insertion data 128 in memory 106. The data filter 124 filters received incoming data 108 containing actual data and the random insertion data by comparing the stored copy of the generated random insertion data with the incoming data 108 to determine which of the incoming data is actual data. For example, on a message by message basis, the data filter 124 will compare an incoming message with the stored copy of the random insertion data from memory 106. If the stored random insertion data matches the incoming message data, indicating that the incoming message data was generated by the random data generator and hence is "fake" message data, the filter determines that the incoming message is not actual application message data and deletes the incoming message. If, however, the comparison indicates that a match does not exist, the received incoming message is actual message data 122 generated by the keyboard 112 and the data filter 124 passes the actual application message (actual data 130) to the message processor 129 where it is processed as an actual message using any suitable processing technique, as known in the art. As such, the application 104 processes the actual data resultant from filtering, for use by the software application.

In one embodiment, where multiple applications may be activated concurrently, the random data generator 126 analyzes software application foreground indication data 134 to determine which application has been designated to receive the incoming message data 108. For example, where a plurality of software applications are operating in a Windows-based operating system, the window activated as the window in the foreground is designated as the application to receive the incoming data. In this way, the random data generator will only generate a random insertion data when the application is expecting to receive incoming data.

In addition, also if desired, the random insertion data 128 may be stored in memory treated as a first in first out buffer (FIFO), and buffer fill data 136 may be used by the random data generator 126 to determine a number of buffer entries used. The buffer fill data may be any data representing for example the number of entries filled, the number of entries empty or any suitable data. If the buffer is full, the random data generator 126 stops generating random data to avoid buffer overflow conditions.

Figure 2:
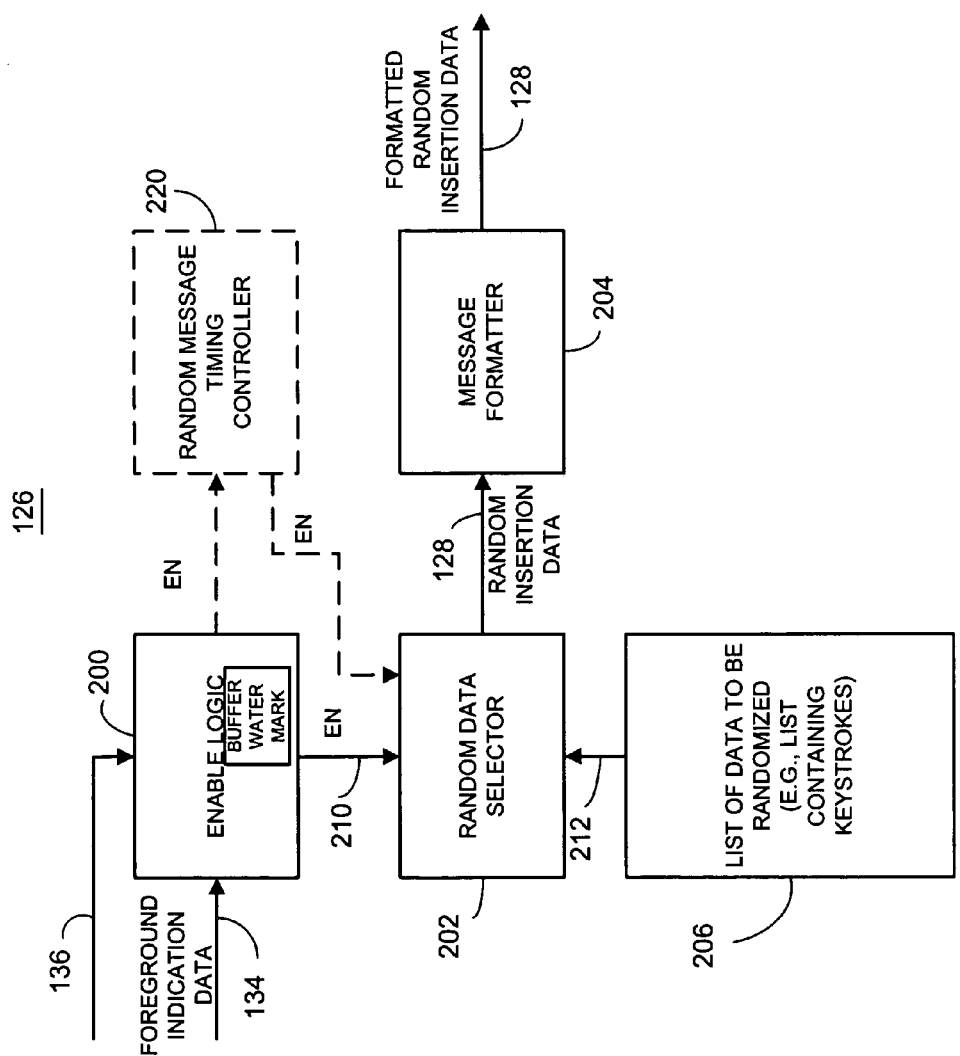
FIG. 2 is a block diagram illustrating one embodiment of a random data generator in accordance with one embodiment of the invention.

FIG. 2 illustrates in more detail a block diagram of one example of the random data generator 126 which in this embodiment serves as a random keystroke message generator. As shown, the random data generator 126 may include enable logic 200, random data selector 202, message formatter 204, and access to or storage for a list of data representing data to be randomized 206. In the example where the actual data is keystroke data, the list of data representing data to be randomized 206 may include a list of stored keystrokes that will likely be entered by a user. This is the data that a user wishes to hide from a keystroke sniffing program, for example. Any other suitable data may be also used. The random data selector 202 may be any suitable random number generator which randomly pulls data from the list 206. The enable logic 200 may be any suitable hardware or software which enables the random data selector 202 to operate. For example, the enable logic may include a buffer watermark register or have access to such register to determine whether there are enough FIFO buffer entries to store random insertion data 128. In addition, the enable logic 200 analyzes the foreground indication data 134, if used, to determine whether the current application has been selected by the operating system as the application for receiving messages from the message queue 110, or from some other suitable message source. After analyzing the foreground indication data 134, the enable logic 200 enables generation of the random insertion data 128 in response to an indication that the application has been selected to receive incoming data. As such, the enable logic may generate an enable signal 210 to enable the random data selector 202 to activate. The random data selector 202 randomly selects data from a list of data 206 as the random insertion data 128. However, if the random data selector does not place the randomly selected data 212 in a suitable format, a message formatter 204 formats the randomly selected data to place it in the form of message data understood by the operating system and application. As such, the message formatter formats the random insertion data to be in the same format as actual data 132 that is used by the message generator. The random insertion data 128 is then sent to the message generator and message provider 120 and a copy is stored in memory 106.

It will be recognized that the enable logic may be excluded if desired. Also, the random insertion data can be continually generated and stored in memory but not sent as message data. With such an embodiment, the application can start outputting the insertion data when the application is set to receive incoming data and the buffer entry receiving a copy of the first inserted message can be tagged as the first entry of the FIFO and other entries can be cleared or written over as more inserted messages are generated.

Figure 3:
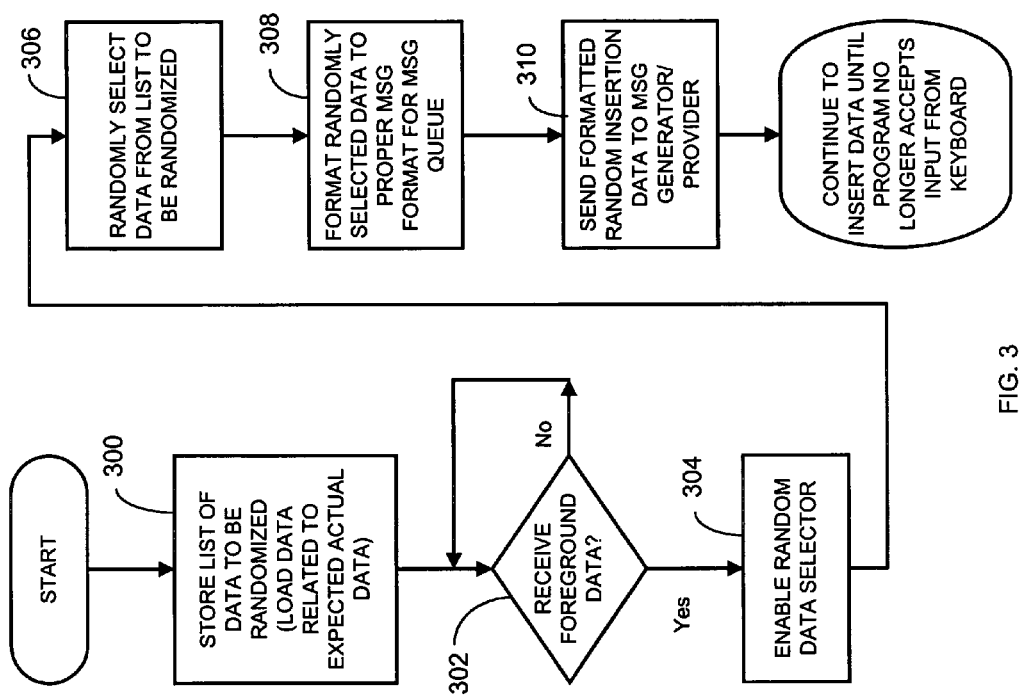
FIG. 3 is a flow chart illustrating one method of data insertion performed by a random message generator in accordance with one embodiment of the invention.

FIG. 3 illustrates one example of the operation of the message generator shown in FIG. 2. As shown in block 300, the software application stores the list of data 206 to be randomized. For example, this may include keystroke data such as each character expected to be eventually sent from a keystroke source. As shown in block 302, the enable logic determines whether it has received foreground indication data 134 indicating that incoming data is being delivered to the application. If the foreground indicator data indicates that the application is to receive incoming data, the enable logic enables a selector 202. This is shown in block 304. If desired, message timing control circuit 220 may also be used to provide suitable timing for the output of the random insertion data 128 to the message queue 110. For example, the timing 220 circuit controls the timing of the random insertion data generation and the timing of its output based on data queue parameters. For example, data queue parameters may include the size of the message queue and how quickly messages are sent to a message queue, for example. This data may be obtained by experiment or may be preprogrammed or obtained in any other suitable fashion.

As shown in block 306, the random data selector then randomly selects data from the list of data to be randomized to create the fake message data for insertion. As shown in block 308, the message formatter then formats the fake message data (i.e., the random insertion data) to the proper message format for the operating system. As shown in block 310, the random data generator sends the formatted random message or random insertion data to the message generator and message provider As used herein, the term "random" does not mean absolutely random. As used herein, random can be any level of difference between the actual incoming data and the inserted data so that a keyboard sniffing program or other attacker cannot readily detect which messages are actual messages and which messages are fake messages inserted by the application receiving the incoming data. For example, random data may be data that is independent from incoming data—e.g., not derived therefrom, or data that is a function of the incoming data such as a value resultant from a hash function.

Figure 4:
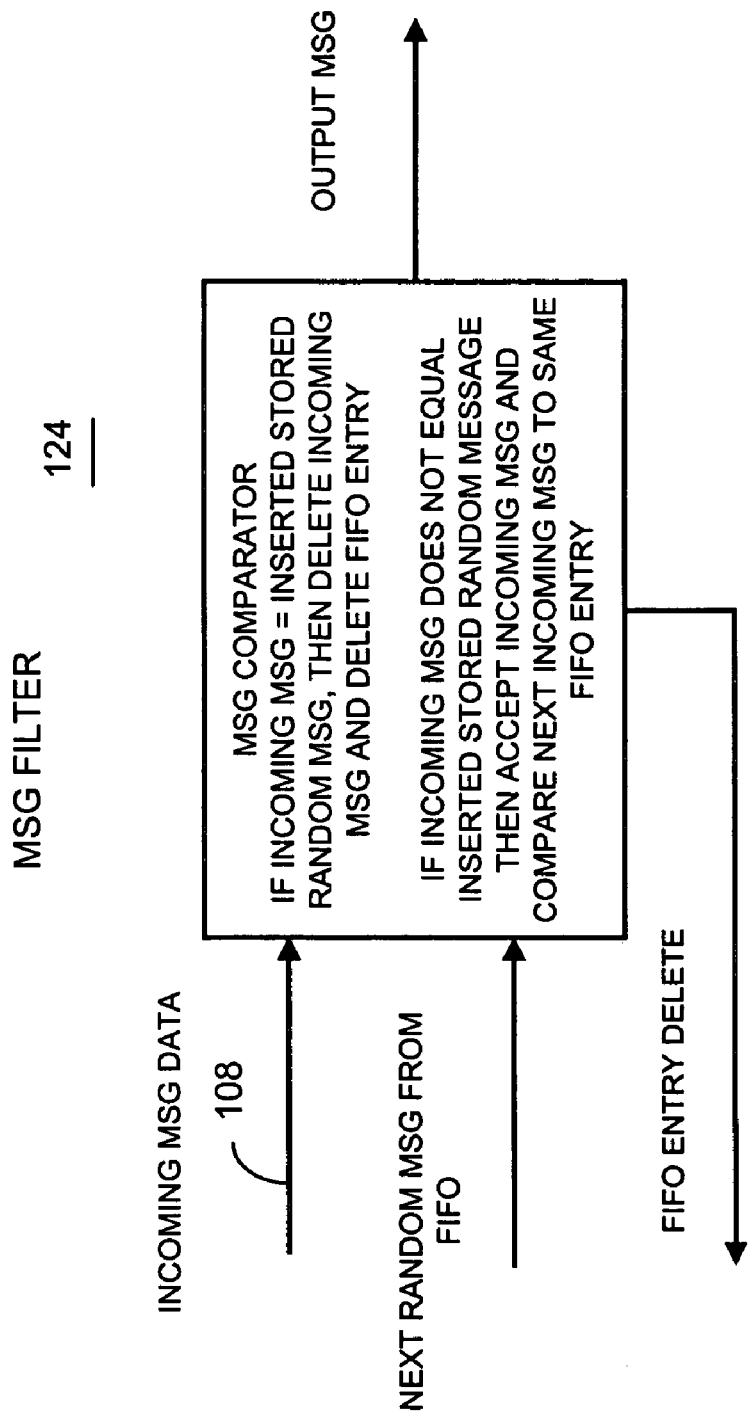
FIG. 4 is a block diagram illustrating one example of a data filter in accordance with one embodiment of the invention.

FIG. 4 shows a block diagram of the data filter 124 which analyzes, on a per message basis or other suitable basis, incoming data 108 from the message queue 110. The data filter 124 also looks at the next random insertion data entry that is stored in the FIFO. For example, if a stored random message is stored in the FIFO, the next entry of the FIFO is either read or looked at by the filter. This next random message entry is then compared to determine whether the received incoming message matches a message that was generated as a fake message. As such, where the memory 106 is a FIFO buffer that stores the generated random insertion data as entries, the filter filters the incoming data by comparing incoming data through the comparator to at least one entry of the stored random insertion data and deletes the entry of the stored random data and deletes the incoming message when the stored random data is the same as the incoming data. Alternatively, when the incoming data in the stored random data does not match, the filter passes the message data through to the message processor indicating that the incoming message was actual data from the keyboard.

Figure 5:
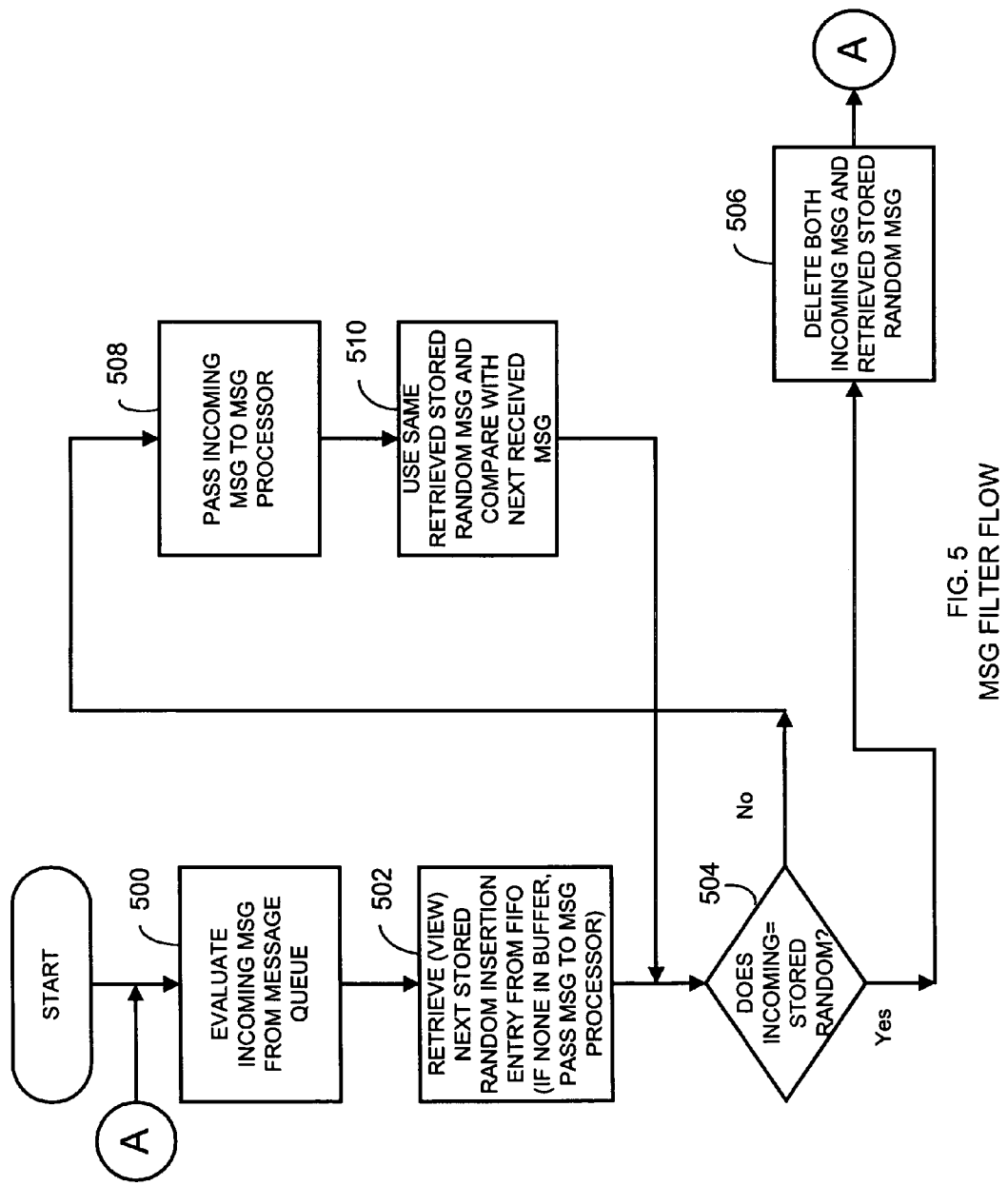
FIG. 5 is a flow chart illustrating one embodiment of a method of operation of the message filter shown in FIG. 4.

FIG. 5 illustrates this operation by showing in block 500 that the filter evaluates the incoming message on a per message basis as received from the message queue. As shown in block 502, the filter retrieves the next stored random message entry from the FIFO. If there are no entries in the FIFO, the filter passes the message to the message processor. As shown in block 504, the filter compares the incoming message to the retrieved stored random insertion data. If the incoming message matches the retrieved stored random message, the filter then deletes both the incoming message and the corresponding stored random messages as shown in block 506. If, however, the incoming message data does not match the retrieved stored random data, the filter passes the incoming message to the message processor as shown in block 508. The filter then uses the same retrieved stored random message and compares the same stored message to the next incoming message as shown in block 510. This process then continues until no more incoming messages are received.

If desired, the above disclosed operations and structures may be implemented via software, to control one or more processing units to operate as described herein. As such, a storage medium containing memory, such as a CD ROM, hard drive, portable storage unit or any other suitable storage medium may contain memory having executable instructions that when read by one or more processing units, causes one or more of the processing units to generate the random insertion data for insertion as part of the incoming data, for a software application; store the generated random insertion data; filter received incoming data containing actual data in the random insertion data, by comparing stored generated random insertion data with incoming data to determine which data is actual data. In addition, the storage medium may contain executable instructions that when read by one or more processing units causes one more processing unit to carry out other of the above-disclosed further operations as also set forth in the claims below.

As such, a keyboard sniffing application or other application attempting to intercept messages from the message queue for a particular application, cannot determine which keyboard strokes are actual keyboard strokes and which are ones that are randomly generated keyboard strokes inserted as "fake" messages. Since the application 104 that is receiving the incoming data generates the dummy data, it can operate independently of whether or not the operating system has or does not have an interception protection mechanism.

It will be recognized that the aforedescribed structure, functions and operations may be performed using any suitable hardware, software, firmware or any suitable combination thereof including but not limited to digital signal processors, ASIC's, microcontrollers, microprocessors, digital logic or any suitable software or hardware.

It should be understood that the implementation of other variations and modifications of the invention in its various aspects will be apparent to those of ordinary skill in the art, and that the invention is not limited by the specific embodiments described. For example, storing the generated insertion data includes storing any function of the insertion data. It is therefore contemplated to cover by the present invention, any and all modifications, variations, or equivalents that fall within the spirit and scope of the basic underlying principles disclosed and claimed herein.

What is claimed is:

1. A method for facilitating prevention of interception of incoming data that is provided for an executing software application, comprising:
preventing interception of the incoming data, by providing non key based insertion data for insertion as part of the incoming data;
storing the provided insertion data;
filtering received incoming data containing actual data and the insertion data by comparing stored provided insertion data with incoming data to determine which data is actual data; and
controlling timing of insertion data generation and output based on data queue parameters.

2. The method of claim 1 including processing the actual data resultant from filtering for use by the executing software application.

3. The method of claim 1 including:
receiving the provided insertion data and actual data from a data input source; and
queuing the insertion data with the actual data for output as the incoming data.

4. The method of claim 1 including analyzing foreground indication data and enabling generation of the insertion data in response to the foreground indication data.

5. The method of claim 1 wherein the insertion data is fake data.

6. A method of facilitating prevention of interception of incoming data that is provided for an executing software application, comprising:
analyzing foreground indication data and enabling generation of insertion data in response to the foreground indication data;
storing a list of data representing data to be randomized;
selecting data from the list of data as random insertion data that prevents interception of incoming data;
providing selected insertion data for insertion as part of the incoming data;
formatting the insertion data in a same format as actual data;
storing the provided insertion data;
mixing the insertion data with the incoming data; and
filtering received incoming data actual data and the random insertion data by comparing stored generated insertion data with incoming data to determine which data is actual data.

7. The method of claim 6 including processing the actual data resultant from filtering for use by the executing software application.

8. The method of claim 6 including:
receiving the provided random insertion data and actual data from a data input source; and
queuing the random insertion data with the actual data for output as the incoming data.

9. The method of claim 6 including controlling timing of random insertion data generation and output based on data queue parameters.

10. The method of claim 6 wherein storing includes storing the generated insertion data as entries in a first in first out (FIFO) buffer and wherein filtering further includes comparing the incoming data to at least one entry of stored insertion data and deleting the at least one entry of stored random data, and deleting the incoming data when the stored data is the same as the incoming data, and outputting the incoming data to a data processor when the stored data from the entry is different from the incoming data.

11. The method of claim 10 wherein the actual data is keystroke data from a keystroke source, wherein the insertion data is randomized keystroke data and wherein the keystroke data and the randomized keystroke data are queued in a message queue and passed in the form of a message to the software application as incoming data.

12. An apparatus for facilitating prevention of interception of incoming data comprising:
means for providing non key based insertion data, that prevents interception of the incoming data, for insertion as part of the incoming data;
means for storing the provided insertion data;
means for filtering received incoming data containing actual data and the insertion data by comparing stored provided insertion data with incoming data to determine which data is actual data for use by a software application;
wherein the means for filtering receives the provided insertion data and actual data, and wherein the apparatus includes means for queuing the insertion data and the actual data for output as the incoming data; and
wherein the means for providing the insertion data includes timing means for controlling timing of random insertion data generation and output based on data queue parameters.

13. The apparatus of claim 12 wherein the means for providing insertion data generates the insertion data in response to foreground indication data.

14. The apparatus of claim 12 wherein the insertion data is fake data.

15. An apparatus for facilitating prevention of interception of incoming data comprising:
means for storing a list of data representing data to be randomized;
means, operatively coupled to the means for storing the list of data, for randomly selecting data from the list of data
means for providing random insertion data, using the randomly selected data from the list of data, for insertion as part of the incoming data in response to foreground indication data;
means for formatting the random insertion data in a same format as actual data;
means for mixing the insertion data with the actual data;
means for storing the random insertion data; and
means for filtering received incoming data containing actual data and the random insertion data by comparing stored generated random insertion data with incoming data to determine which data is actual data for use by a software application.

16. The apparatus of claim 15 including means, operatively coupled to the means for filtering, for processing the actual data resultant from filtering for use by the software application.

17. The apparatus of claim 15 wherein the means for filtering receives the generated random insertion data and actual data, and wherein the apparatus includes means for queuing the random insertion data and the actual data for output as the incoming data.

18. The apparatus of claim 17 wherein the actual data is keystroke data from a keystroke source, wherein the insertion data is randomized keystroke data and wherein the keystroke data and the randomized keystroke data are queued in a message queue and passed in the form of a message to the software application as incoming data.

19. The apparatus of claim 15 wherein the means for generating the random insertion data includes timing means for controlling timing of random insertion data generation and output based on data queue parameters.

20. The apparatus of claim 15 wherein the means for storing includes a first in first out (FIFO) buffer that stores the generated random insertion data as entries therein and wherein the means for filtering incoming data further includes means for comparing the incoming data to at least one entry of stored random insertion data and deleting the at least one entry of stored random data, and deleting the incoming data when the stored random data is the same as the incoming data, and outputting the incoming data to a data processor when the stored random data from the entry is different from the incoming data.

21. A storage medium comprising memory containing executable instructions that when read by one or more processing units, causes one or more processing units to:
    generation non key based insertion data, that prevents interception of incoming data, for insertion as part of the incoming data, for a software application;
    store the generated insertion data;
    filter received incoming data containing actual data and the insertion data by comparing stored generated insertion data with incoming data to determine which data is actual data;
    analyze foreground indication data and enable generation of the random insertion data in response to the foreground indication data; and
    control timing of random insertion data generation and output based on data queue parameters.

22. The storage medium of claim 21 containing executable instructions that when read by one or more processing units, causes one or more processing units to process the actual data resultant from filtering for use by the software application.

23. The storage medium of claim 21 containing executable instructions that when read by one or more processing units, causes one or more processing units to:
    receive the generated insertion data and actual data from a data input source; and
    queue the insertion data and the actual data for output as the incoming data.

24. The storage medium of claim 21 wherein the insertion data is fake data.

25. A method for facilitating prevention of interception of incoming data that is provided for a software application, comprising:
    preventing interception of the incoming data, by providing insertion data for insertion as part of the incoming data;
    storing the provided insertion data;
    filtering received incoming data containing actual data and the insertion data by comparing stored provided insertion data with incoming data to determine which data is actual data; and
    wherein the actual data is keystroke data from a keystroke source, wherein the insertion data is randomized keystroke data and wherein the keystroke data and the randomized keystroke data are queued in a message queue and passed in the form of a message to the software application as incoming data.

26. A method for facilitating prevention of interception of incoming data that is provided for an executing software application, comprising:
    preventing interception of the incoming data, by providing non key based insertion data for insertion as part of the incoming data;
    storing the provided insertion data;
    filtering received incoming data containing actual data and the insertion data by comparing stored provided insertion data with incoming data to determine which data is actual data; and
    wherein storing includes storing the provided insertion data as entries in a first in first out (FIFO) buffer and wherein filtering further includes comparing the incoming data to at least one entry of stored insertion data and deleting the at least one entry of stored data and deleting the incoming data when the stored random data is the same as the incoming data, and outputting the incoming data to a data processor when the stored random data from the entry is different from the incoming data.

27. A method for facilitating prevention of interception of incoming data that is provided for an executing software application, comprising:
    preventing interception of the incoming data, by providing non key based insertion data for insertion as part of the incoming data;
    storing the provided insertion data;
    filtering received incoming data containing actual data and the insertion data by comparing stored provided insertion data with incoming data to determine which data is actual data;
    storing a list of data representing data to be used as randomization data;
    randomly selecting the randomized data from the list of data; and
    formatting the randomized data as insertion data in a same format as actual data.

28. A method for facilitating prevention of interception of incoming data that is provided for an executing software application, comprising:
    preventing interception of the incoming data, by providing non key based insertion data for insertion as part of the incoming data;
    storing the provided insertion data;
    filtering received incoming data containing actual data and the insertion data by comparing stored provided insertion data with incoming data to determine which data is actual data; and
    wherein the actual data is keystroke data from a keystroke source, wherein the insertion data is randomized keystroke data and wherein the keystroke data and the randomized keystroke data are queued in a message queue and passed in the form of a message to the software application as incoming data.

29. An apparatus for facilitating prevention of interception of incoming data comprising:
    means for providing non key based insertion data, that prevents interception of the incoming data, for insertion as part of the incoming data;
    means for storing the provided insertion data;
    means for filtering received incoming data containing actual data and the insertion data by comparing stored provided insertion data with incoming data to determine which data is actual data for use by a software application; and
    wherein the means for storing includes a first in first out (FIFO) buffer that stores the generated random insertion data as entries therein and wherein the means for filtering incoming data further includes means for comparing the incoming data to at least one entry of stored random insertion data and deleting the at least one entry of stored random data, and deleting the incoming data when the stored random data is the same as the incoming data, and outputting the incoming data to a data processor when the stored random data from the entry is different from the incoming data.

30. An apparatus for facilitating prevention of interception of incoming data comprising:
   means for providing non key based insertion data, that prevents interception of the incoming data, for insertion as part of the incoming data;
   means for storing the provided insertion data;
   means for filtering received incoming data containing actual data and the insertion data by comparing stored provided insertion data with incoming data to determine which data is actual data for use by a software application;
   means, operatively coupled to the means for filtering, for processing the actual data resultant from filtering for use by the software application;
   means for storing a list of data representing data to be randomized;
   means, operatively coupled to the means for storing the list of data, for selecting data from the list of data as random insertion data; and
   means for formatting the random insertion data in a same format as actual data.

31. The apparatus of claim 30 wherein the actual data is keystroke data from a keystroke source, wherein the insertion data is randomized keystroke data and wherein the keystroke data and the randomized keystroke data are queued in a message queue and passed in the form of a message to the software application as incoming data.

32. A storage medium comprising memory containing executable instructions that when read by one or more processing units, causes one or more processing units to:
   generate non key based insertion data, that prevents interception of incoming data, for insertion as part of the incoming data, for a software application;
   store the generated insertion data;
   filter received incoming data containing actual data and the insertion data by comparing stored generated insertion data with incoming data to determine which data is actual data; and
   store the generated insertion data as entries in a first in first out (FIFO) buffer and compare the incoming data to at least one entry of stored insertion data and delete the at least one entry of stored data, and delete the incoming data when the stored data is the same as the incoming data, and output the incoming data to a data processor when the stored data from the entry is different from the incoming data.

33. A storage medium comprising memory containing executable instructions that when ready by one or more processing units, causes one or more processing units to:
   generating non key based insertion data, that prevents interception of incoming data, for insertion as part of the incoming data, for a software application;
   store the generated insertion data;
   filter received incoming data containing actual data and the insertion data by comparing stored generated insertion data with incoming data to determine which data is actual data;
   store a list representing data to be randomized;
   randomly select data from the list of data as random insertion data; and
   format the random insertion data in a same format as actual data.

34. The storage medium of claim 33 wherein the actual data is keystroke data from a keystroke source, wherein the insertion data is randomized key stroke data and wherein the keystroke data and the randomized keystroke data are queued in a message queue and passed in the form of a message to the software application as incoming data.

* * * * *